(12) United States Patent
Utsugi

(10) Patent No.: US 6,785,045 B2
(45) Date of Patent: Aug. 31, 2004

(54) MICROSCOPE FOCUSING APPARATUS

(75) Inventor: Hironori Utsugi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 30 days.

(21) Appl. No.: 09/901,548

(22) Filed: Jul. 9, 2001

(65) Prior Publication Data

US 2002/0044348 A1 Apr. 18, 2002

(30) Foreign Application Priority Data

Jul. 10, 2000 (JP) ........................................ 2000-208998
Jul. 4, 2001 (JP) ........................................ 2001-203058

(51) Int. Cl.[7] .......................... G02B 21/00; G02B 21/06
(52) U.S. Cl. ........................ 359/383; 359/368; 359/390
(58) Field of Search .................... 359/368, 382–385, 359/390, 810–819

(56) References Cited

U.S. PATENT DOCUMENTS

| 4,445,758 | A | * | 5/1984 | Emmel | 359/392 |
| 4,565,427 | A | * | 1/1986 | Schilling et al. | 359/392 |
| 4,676,608 | A | * | 6/1987 | Faubion | 359/383 |
| 4,729,646 | A | * | 3/1988 | Clark et al. | 359/383 |
| 5,270,855 | A | * | 12/1993 | Hasegawa | 359/368 |
| 5,703,714 | A | * | 12/1997 | Kojima | 359/368 |
| 5,946,133 | A | * | 8/1999 | Aikawa | 359/383 |
| 6,072,622 | A | * | 6/2000 | Biber | 359/368 |
| 6,160,662 | A | * | 12/2000 | Uchida et al. | 359/390 |
| 6,351,325 | B1 | * | 2/2002 | Mandella et al. | 359/210 |

FOREIGN PATENT DOCUMENTS

JP 5-45590 * 2/1993 ................. 359/383

* cited by examiner

Primary Examiner—Thong Q Nguyen
(74) Attorney, Agent, or Firm—Frishauf, Holtz, Goodman & Chick, P.C.

(57) ABSTRACT

There is disclosed a microscope focusing apparatus comprising a light illuminator, an objective lens, an observation tube, a holder which holds these, a focusing main body including a focusing movable portion which linearly and vertically moves, and an attaching portion, formed in the focusing movable portion, which fixes the holder, wherein the holder comprises a first holder including a first support, the first support disposed on an observation optical axis, which supports the light illuminator, and a second holder including a second support, the second support disposed outside the observation optical axis, which supports the light illuminator, and one of the first and second holders can be selectively attached to the attaching portion.

13 Claims, 12 Drawing Sheets

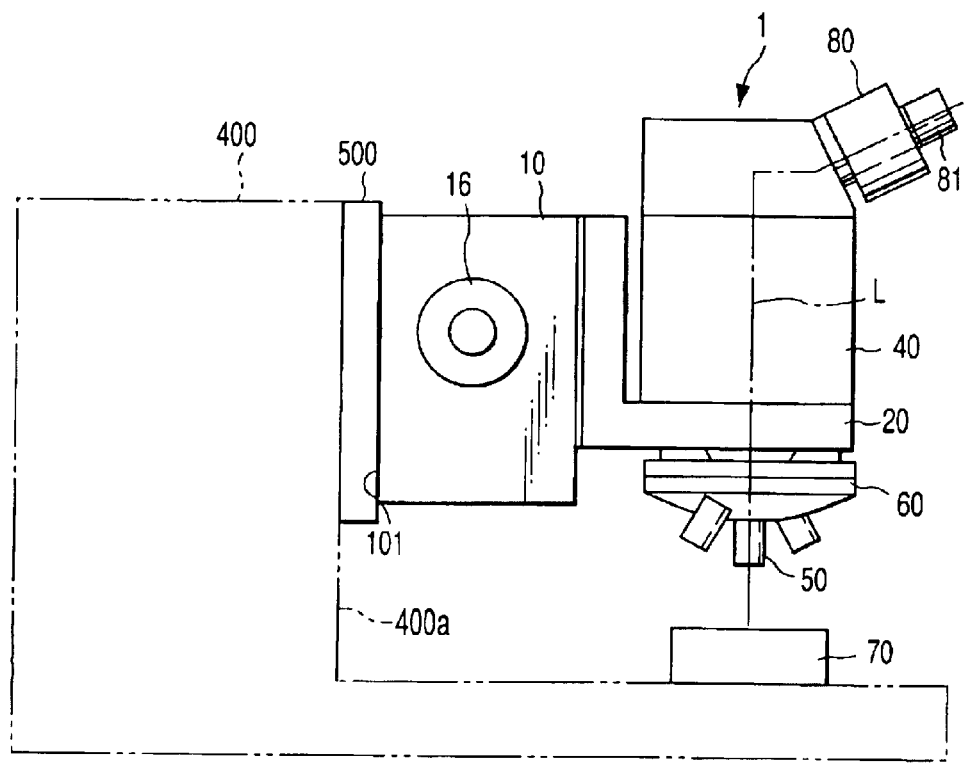
F I G. 15A
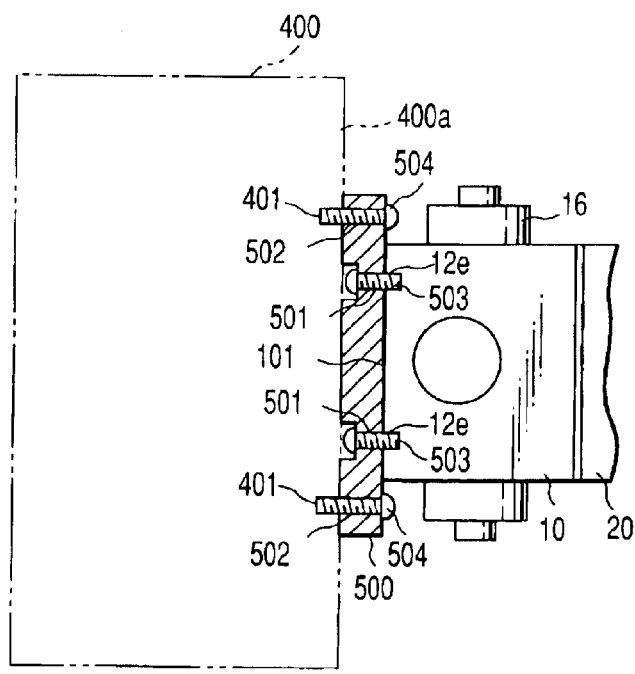
F I G. 15B

MICROSCOPE FOCUSING APPARATUS

CROSS-REFERENCE TO RELATED APPLICATIONS

This application is based upon and claims the benefit of priority from the prior Japanese Patent Applications No. 2000-208998, filed Jul. 10, 2000; and No. 2001-203058, filed Jul. 4, 2001, the entire contents of which are incorporated herein by reference.

BACKGROUND OF THE INVENTION

The present invention relates to a microscope focusing apparatus for vertically moving a microscope including a light illuminator for lighting a sample, and focusing on the sample.

A conventional example of a microscope focusing apparatus is disclosed in U.S. Pat. No. 4,729,646. The apparatus is a microscope supporting module type apparatus including a linearly movable microscope holder for holding a microscope by a fastener disposed in an opening, a linearly movable slide member for supporting the holder with a fixing screw, and a focusing main body including a column for holding the slide member. In the apparatus, a constituted main component is formed of an extruded/processed material, and an attachment unit can inexpensively be attached to the column.

Moreover, in an apparatus disclosed in U.S. Pat. No. 4,565,427, an additional drive transmission apparatus disposed between a focusing drive transmission apparatus and a stage holder is used to rapidly adjust and dispose the microscope in a predetermined position. In the drive transmission apparatus, an eccentric member disposed in the stage holder is rotated by an auxiliary handle disposed separately from a focusing handle, and a stage is raised/lowered to a predetermined height.

With the microscope incorporated for use in an apparatus in a manufacturing factory, and the like, since the microscope holder is of an opening type in the module type focusing apparatus disclosed in the U.S. Pat. No. 4,729,646, a shape of the attached microscope is limited by an opening shape.

A microscope including a light illuminator for lighting a sample is generally attached to a microscope frame comprising a stage on which the sample is to be mounted and a focusing mechanism for focusing on the sample. Therefore, the microscope is not configured to be attached to the opening like the microscope holder. For example, a relatively light illuminator is fixed with a round dovetail. For a heavy light illuminator, since a round dovetail system has an insufficient rigidity, a bolt fixing system or the like is employed.

Moreover, a weight of the microscope largely differs, and a load outside an ability range is applied to the focusing main body. Then, the microscope is naturally lowered and the sample cannot be focused.

Furthermore, since a gravity position of the microscope is not coaxial with a focus moving axis of the focusing main body, a moment is added to a guide of the focusing main body besides the load of a moving axis. When the gravity position and weight of the microscope largely differ and a moment exceeding an allowable rigidity of the guide is added, an image blur occurs, and a satisfactory observed image cannot be obtained.

On the other hand, in the additional drive transmission apparatus disclosed in the U.S. Pat. No. 4,565,427, the auxiliary handle is used to rapidly and vertically move the stage by the predetermined height, and a reduction ratio of the focusing handle cannot be selected.

In these conventional arts, the microscope focusing apparatus is exclusively used and a separate focusing handle apparatus is added. Moreover, for the microscope holder, the microscope is inserted and fixed in the slide member by engagement using a slide dovetail. Therefore, in order to smoothly attach the microscope to the slide member, a high-precision slide dovetail processing is required.

BRIEF SUMMARY OF THE INVENTION

An object of the present invention is to provide a microscope focusing apparatus which can broadly and inexpensively be attached to a microscope.

According to the present invention, there is provided a microscope focusing apparatus comprising: a light illuminator; an objective lens; an observation tube; a holder which holds the light illuminator, the objective lens and the observation tube; a focusing main body including a focusing movable portion which linearly and vertically moves; and an attaching portion, formed in the focusing movable portion, which fixes the holder, wherein the holder comprises a first holder including a first support, the first support disposed on an observation optical axis, which supports the light illuminator, and a second holder including a second support, the second support disposed outside the observation optical axis, which supports the light illuminator, and one of the first and second holders can be selectively attached to the attaching portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15A is a side view showing a configuration in which the microscope focusing apparatus according to the embodiment of the present invention is applied to various apparatuses.

FIG. 15B is a schematic plan sectional view showing the configuration in which the microscope focusing apparatus according to the embodiment of the present invention is applied to various apparatuses.

DETAILED DESCRIPTION OF THE INVENTION

Preferred embodiments of the present invention will be described hereinafter with reference to the drawings.

Figure 1:
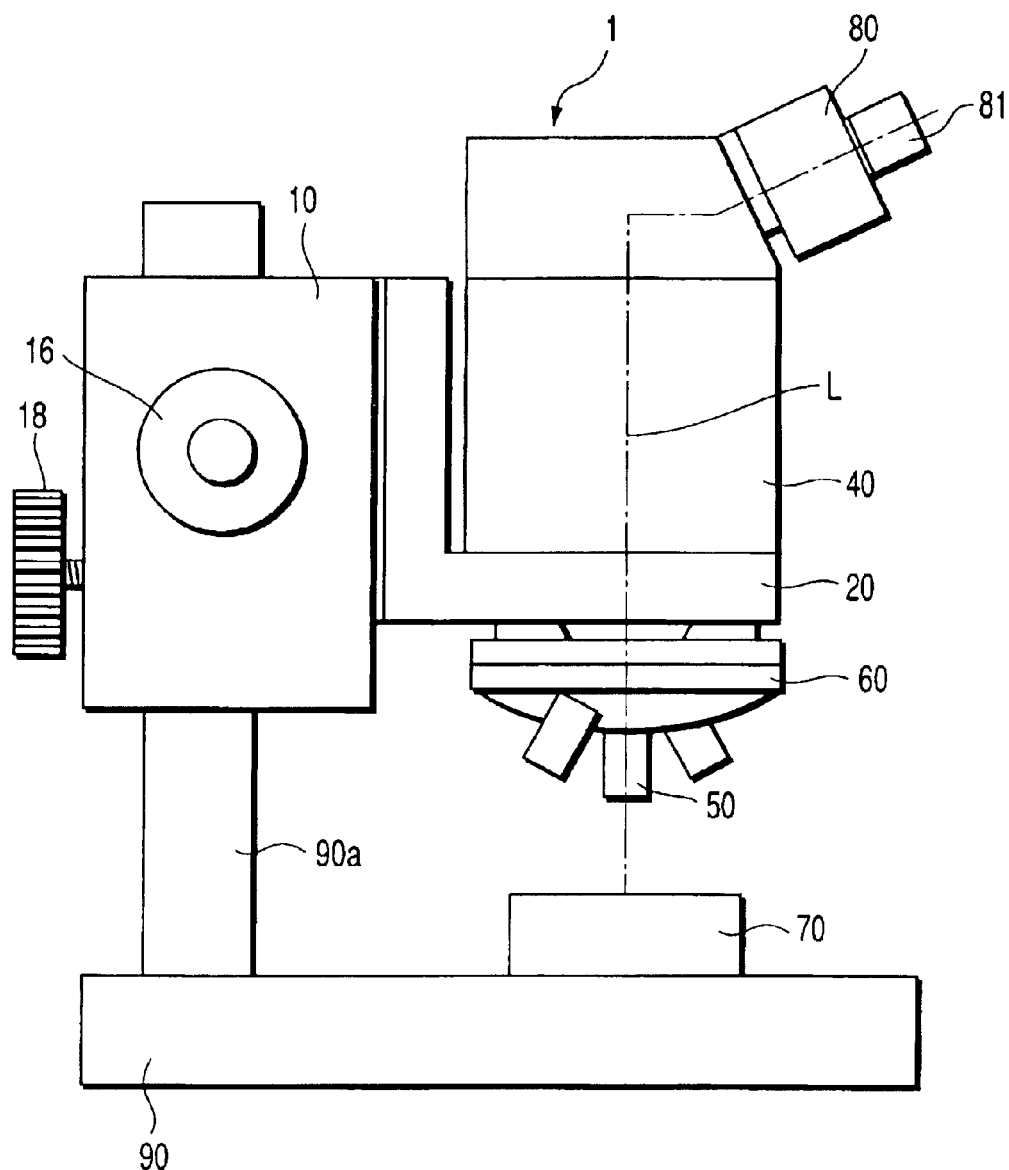
FIG. 1 is a side view showing a schematic configuration of a microscope focusing apparatus according to an embodiment of the present invention.
Figure 2:
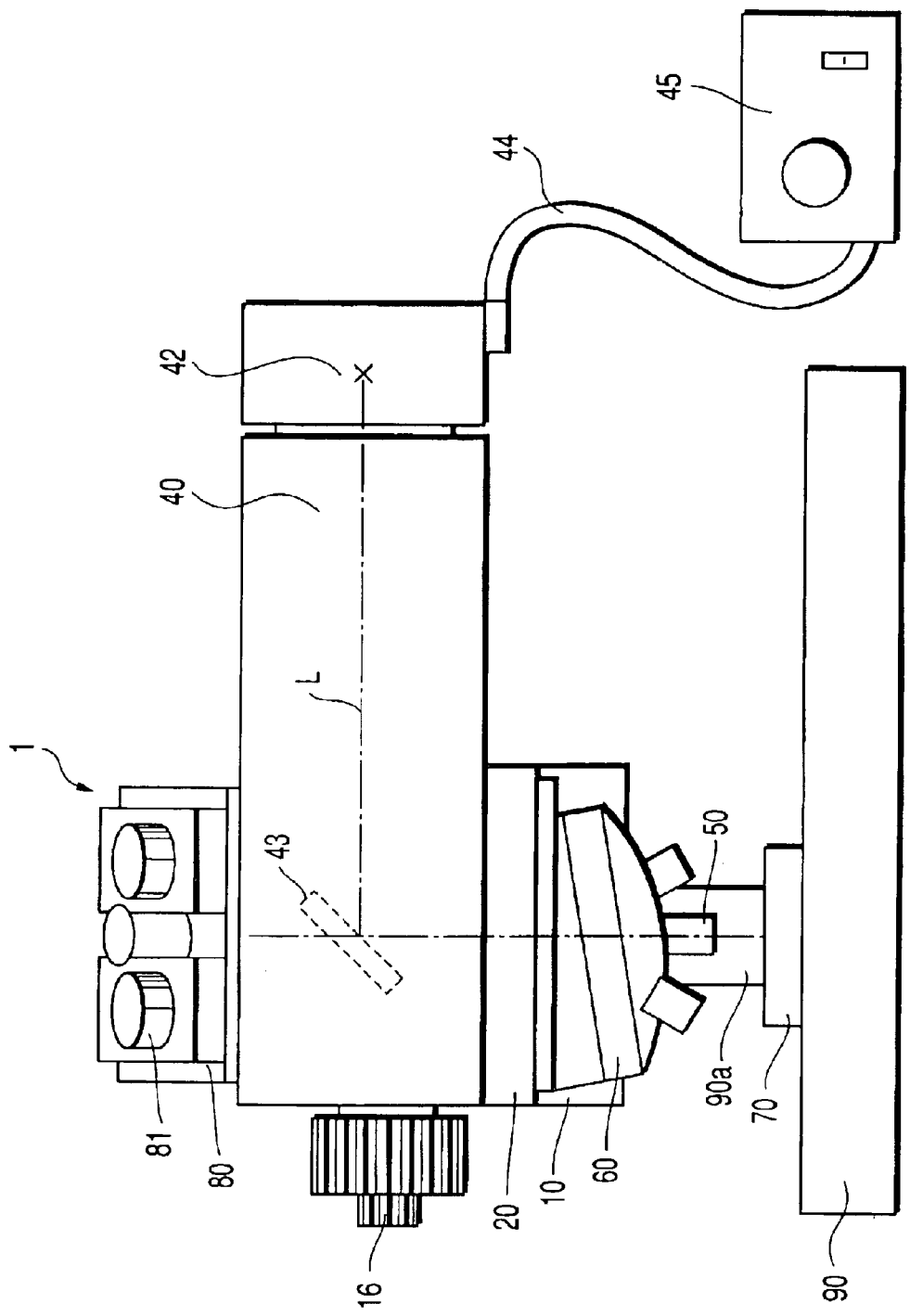
FIG. 2 is a front view showing the schematic configuration of the microscope focusing apparatus according to the embodiment of the present invention.

FIGS. 1 and 2 are views showing a schematic configuration of a microscope focusing apparatus according to a first embodiment of the present invention, FIG. 1 is a side view, and FIG. 2 is a front view.

This microscope focusing apparatus has a microscope 1, and a focusing main body 10 for vertically moving a microscope holder 20 for supporting the microscope 1 (e.g., an observation tube) to focus on a sample 70. The focusing main body 10 has a focusing handle 16 for vertically moving the microscope holder 20, and is fixed to a pole 90a disposed on a stand 90 with a fastener 18.

A revolver 60 for holding a plurality of objective lenses 50 is attached to a lower surface of the microscope holder 20. The revolver 60 with the objective lenses 50 attached thereto can freely rotate. When the revolver 60 is rotated/positioned, the objective lens 50 having a predetermined magnification can be disposed on an optical axis (observation optical axis) L.

On the other hand, a light illuminator 40 for projecting a lighting light to the sample 70 is attached to an upper surface of the microscope holder 20. A lamp light source 42 is disposed on an end of the light illuminator 40, and the lamp light source 42 is connected to a power source 45 via a power cable 44.

The lighting light emitted from the lamp light source 42 changes its direction to a downward direction by a half mirror 43 in the light illuminator 40, and the sample 70 is irradiated via the microscope holder 20, revolver 60, and objective lens 50. An observed image of the sample 70 is incident upon an observation tube 80 attached to an upper portion of the light illuminator 40 via the objective lens 50, and is observed through an eyepiece lens 81.

Figure 3:
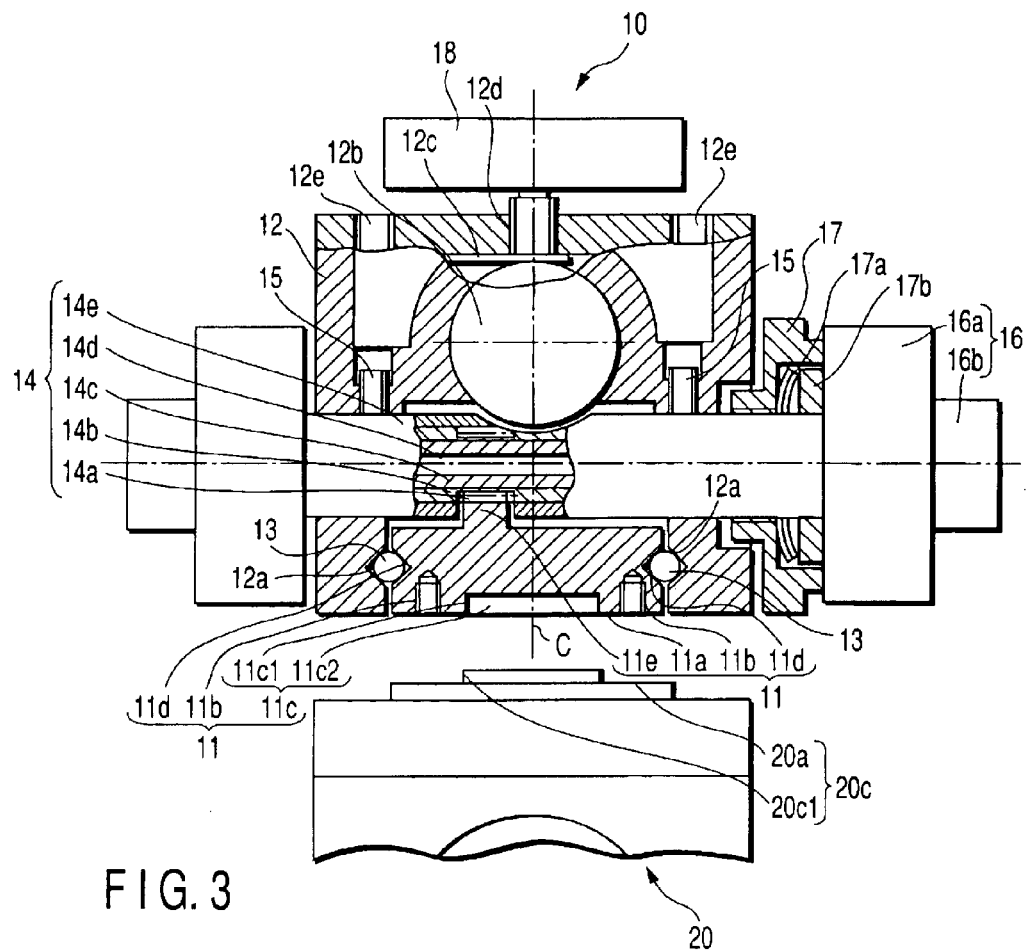
FIG. 3 is a schematic sectional view of a focusing main body as viewed from above according to the embodiment of the present invention, and also shows a shape of an attaching portion of a microscope holder.

FIG. 3 is a schematic sectional view of the focusing main body 10 as viewed from above, and also shows a shape of an attaching portion of the microscope holder 20.

A focusing movable portion 11 has an attaching surface 11a for attaching the microscope holder 20, screw holes 11b, 11b, and a concave positioning portion 11c for positioning the attaching portion.

Surfaces 11d, 11d contacting cylindrical rollers 13, 13 movable along guide grooves 12a, 12a are formed between the guide grooves 12a, 12a of a focusing main body frame 12 in opposite side surfaces of the focusing movable portion 11, and a rack lie is configured on an opposite side of the attaching surface 11a.

The rack 11e meshes with a pinion 14a disposed on a handle rotary shaft 14, and the focusing movable portion 11 linearly and vertically moves along the guide grooves 12a, 12a with rotation of the pinion 14a in the handle rotation axis 14.

The handle rotary shaft 14 has a pinion shaft 14b forming the pinion 14a, coarse movement rotary shaft 14c, slight movement rotary shaft 14d, and a rotation support frame 14e for supporting the pinion shaft 14b, and the rotation support frame 14e is fixed to the focusing main body frame 12 with screws 15, 15.

As is generally known and not shown, the coarse movement rotary shaft 14c is connected to the pinion shaft 14b, and a coarse movement handle 16a is fixed to the coarse movement rotary shaft 14c. Moreover, the slight movement rotary shaft 14d is connected to the pinion shaft 14b via a reduction gear, and a slight movement handle 16b is fixed to the slight movement rotary shaft 14d.

According to such configuration, when the coarse movement handle 16a is rotated, the pinion shaft 14b rotates. When the slight movement handle 16b is rotated, the pinion shaft 14b similarly rotates via the reduction gear, and the focusing movable portion 11 vertically moves as described above.

A coarse movement force amount adjustment handle 17 is screwed into the rotation support frame 14e. When the handle 17 is rotated to contract a spring 17a, a force of a pad 17b which presses the coarse movement handle 16a is changed, and a force amount of the coarse movement handle 16a is adjusted.

The force amount of the coarse movement handle 16a is adjusted in order to prevent the handle from being naturally lowered with respect to microscope holders 20, 21 (see FIG. 6) and an applied load. Moreover, the focusing main body 10 includes a hole 12b, fastener 18, and leaf spring 12c so that the focusing main body is attached to the pole 90a disposed on the stand 90 (see FIG. 1). When the fastener 18 is screwed into a screw hole 12d, the leaf spring 12c is pressed onto the pole 90a passed through the hole 12b, and the focusing main body 10 is fixed.

Figure 4:
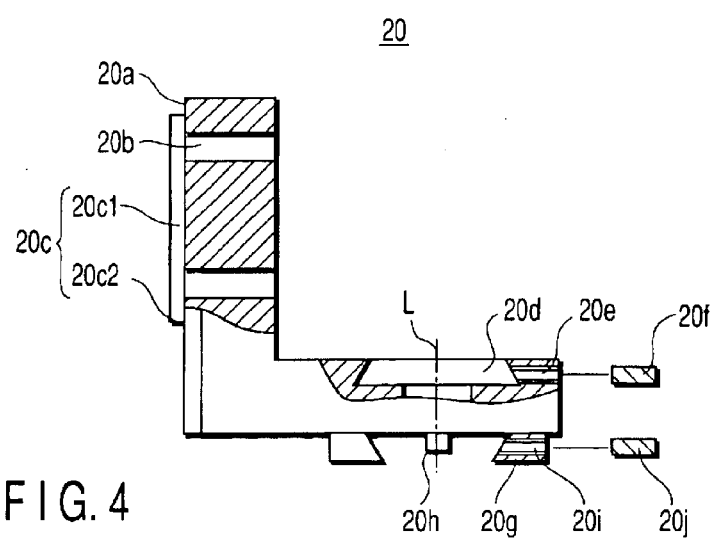
FIG. 4 is a schematic side sectional view of the microscope holder according to the embodiment of the present invention.
Figure 5:
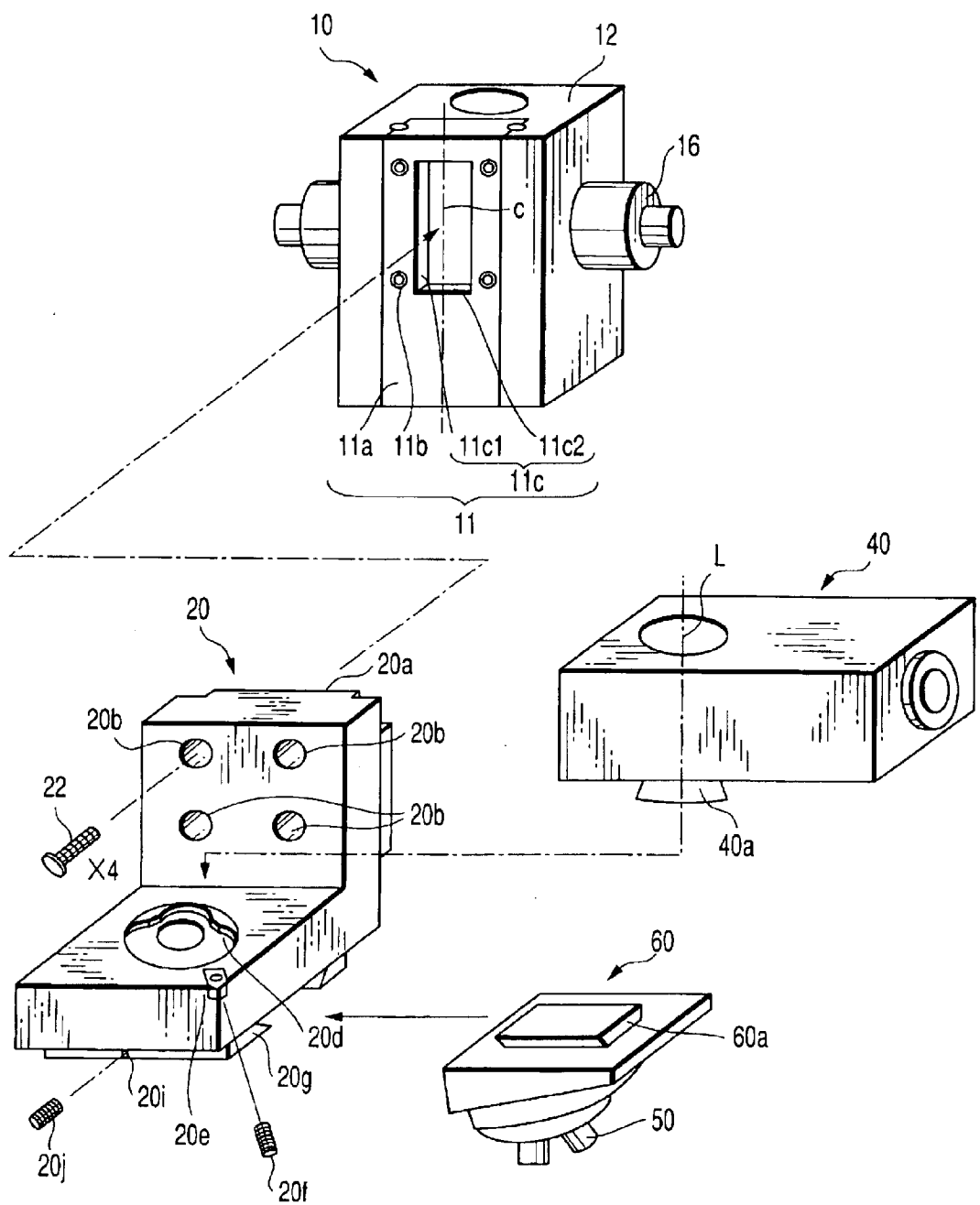
FIG. 5 is a diagram showing an assembled state of the microscope holder, the focusing main body and a light illuminator according to the embodiment of the present invention.

FIG. 4 is a schematic side sectional view of the microscope holder 20, and FIG. 5 is a diagram showing an assembled state of the microscope holder 20, focusing main body 10 and light illuminator 40.

The microscope holder 20 has an attaching surface 20a and fixing hole 20b for attaching the microscope to the focusing movable portion 11, and a positioning portion 20c for positioning the microscope.

In order to assemble the microscope holder 20 and focusing main body 10, the attaching surface 11a disposed on the focusing movable portion 11 of the focusing main body 10 is brought into contact with the attaching surface 20a of the microscope holder 20, and the respective screw holes 11b of the focusing movable portion 11 and the respective fixing holes 20b of the microscope holder 20 are used to fix the microscope holder with four bolts 22 (see FIG. 5).

The microscope holder 20 is attached and positioned in vertical and horizontal directions by inserting the convex positioning portion 20c having wall surfaces 20c1, 20c2 perpendicular to the attaching surface 20a disposed on the microscope holder 20 into the concave positioning portion 11c having wall surfaces 11c1, 11c2 perpendicular to the attaching surface 11a disposed on the focusing movable portion 11, and allowing the convex positioning portion to abut on the concave positioning portion.

In FIG. 4, the positioning portion 20c of the microscope holder 20 projects from the attaching surface 20a. However, the positioning portion 11c disposed on the focusing movable portion 11 (see FIG. 5) may project from the attaching portion 11a, and the positioning portion 20c of the microscope holder 20 may be concave with respect to the attaching surface 20a.

A round female dovetail 20d for attaching the round dovetail fixed type light illuminator 40 is formed in an upper surface of the microscope holder 20. A position of the optical axis L of the horizontal direction, which is determined by a center of the round female dovetail 20d, meets a center C (see FIG. 3) between the left and right guide grooves 12a, 12a disposed in the focusing main body 10 during assembling of the microscope holder 20 with the focusing main body 10.

The light illuminator 40 is securely positioned and fixed by attaching a round male dovetail 40a formed on the light illuminator 40 to the round female dovetail 20d of the microscope holder 20, and screwing a clamp screw 20f into a screw hole 20e formed in the microscope holder 20.

A slide female dovetail 20g for attaching the revolver 60 for holding the plurality of objective lenses 50 is formed on a lower surface of the microscope holder 20. A slide male dovetail 60a formed on a back surface of the revolver 60 is inserted into the slide female dovetail 20g of the microscope holder 20, and the revolver 60 is exactly positioned on the optical axis L determined by the round female dovetail 20d by a protrusion 20h (see FIG. 4) disposed on the lower surface of the microscope holder 20.

Moreover, a screw hole 20i for fixing the revolver 60 is disposed in a side surface of the slide female dovetail 20g of the microscope holder 20, a clamp screw 20j is screwed into this screw hole 20i, and the revolver 60 is thus securely fixed.

Figure 6:
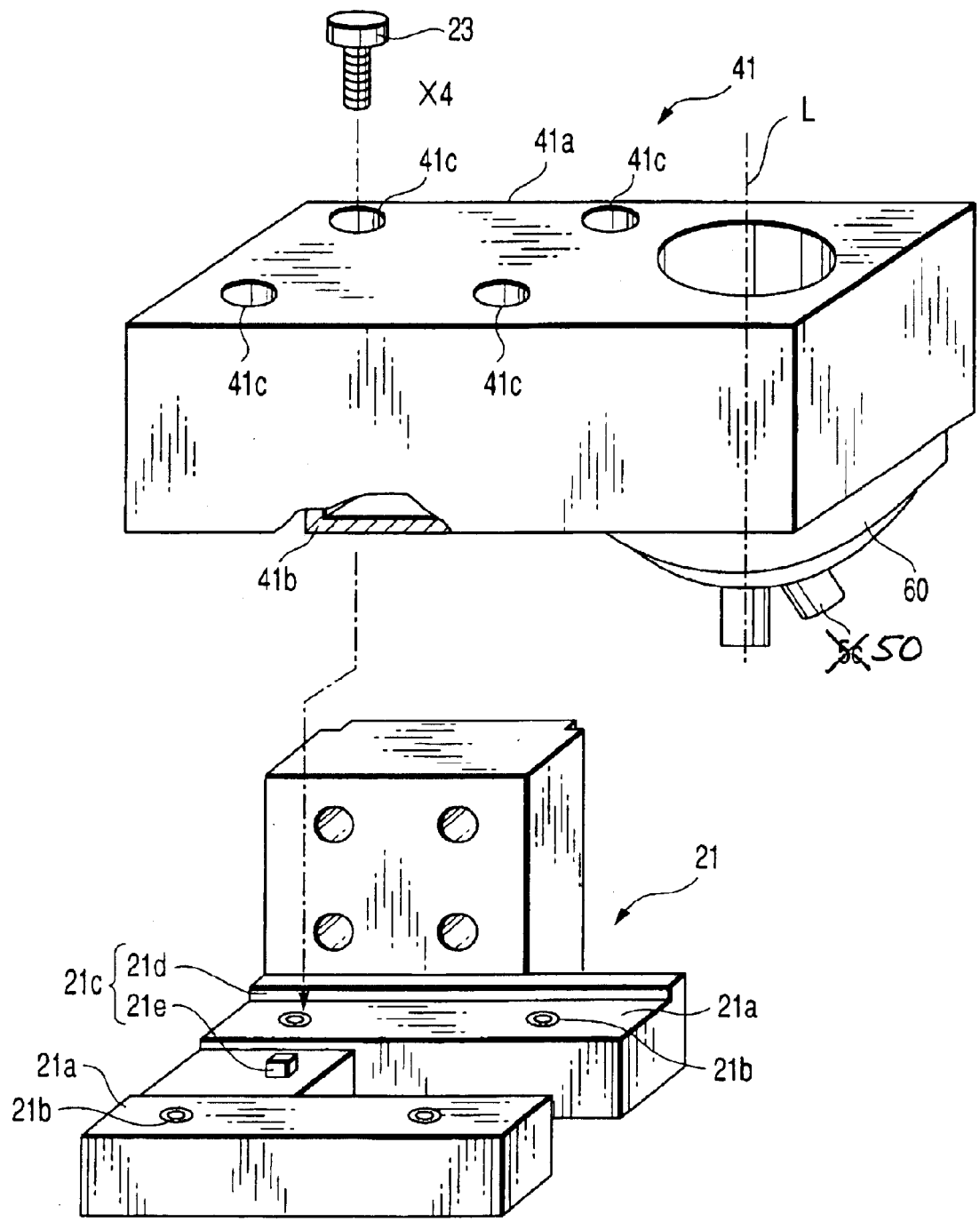
FIG. 6 is a diagram showing an assembled state of the microscope holder and light illuminator in the microscope focusing apparatus according to a modification example of the embodiment of the present invention.

FIG. 6 is a diagram showing an assembled state of the microscope holder 21 and a light illuminator 41 in the microscope focusing apparatus according to a modification example of the first embodiment.

In the modification example, the bolt fixed type light illuminator 41 heavier than the light illuminator 40 is used. As shown in FIG. 6, in order to assemble the light illuminator 41 with the focusing main body 10 (see FIG. 5), the microscope holder 21 has attaching surfaces 21a, 21a for fixing the light illuminator 41, a plurality of screw holes 21b, and a positioning portion 21c for positioning the light illuminator 41.

The positioning portion 21c has a contact portion 21d which can contact with a side surface 41a of the light illuminator 41 to position the light illuminator back and forth in FIG. 6, and a protrusion 21e which contacts with a wall surface 41b disposed on a bottom surface of the light illuminator 41 to position the light illuminator left and right. Thereby, the position of the optical axis L of the light illuminator 41 can be set to a predetermined position with respect to the center C between the left and right guide grooves 12a, 12a of the focusing main body 10.

Additionally, as a modification example, the protrusion 21e is formed in a triangular prism shape, and an inclined surface of the protrusion forms an angle of 45° with respect to a longitudinal direction of the contact portion 21d. Then, the light illuminator 41 guided to the microscope holder 21 from a right direction of FIG. 6 is guided toward the contact 21d side and positioned by the protrusion 21e.

When the light illuminator 41 is attached to the microscope holder 21, four fixing counterbores 41c of the light illuminator 41 and four screw holes 21b of the microscope holder 21 are used to fix the light illuminator and microscope holder with respective bolts 23. The light illuminator and microscope holder are easily positioned by the aforementioned configuration.

The attaching of the microscope holder 21 to the focusing main body 10 is not shown in FIG. 6. However, the attaching portion of the microscope holder 21 has a structure similar to that of the microscope holder 20, and an attaching method is the same. Moreover, the revolver 60 is directly attached with respect to the optical axis L of the bottom surface of the light illuminator 41. Therefore, as not shown in FIG. 6, a slide female dovetail, positioning protrusion, and screw hole for the clamp screw are formed in a portion of the bottom surface of the light illuminator 41 around the optical axis L similar to the microscope holder 20. Thereby, the revolver 60 is securely fixed.

As described above, according to the microscope focusing apparatus of the first embodiment, when the microscope holders 20, 21 for supporting the microscope including the light illuminators 40, 41 are attached to or detached from the focusing main body 10, the present apparatus can easily be assembled in accordance with an attaching shape of the microscope without exclusively using the focusing main body 10.

Therefore, even in the microscope having a different attaching shape, when the microscope holders 20, 21 are selected in accordance with the shape, the same microscope focusing apparatus can be used. Therefore, it is unnecessary to possess a plurality of microscope focusing apparatuses, and the apparatus can be inexpensively provided. Furthermore, when the microscope holder having a different length and size is selected, the position of the optical axis L of the microscope can be easily changed.

Since the optical axis L meets the center C between the guide grooves 12a, 12a of the focusing main body 10 as described above, the microscope holder 20 does not require a large space, and is suitable for a compact microscope system. On the other hand, the microscope holder 21 supports the microscope with the wall surface having general-purpose properties, and can therefore be used in a broad-range system.

The focusing main body 10 is independent of the microscope holders 20, 21. The focusing main body 10 can be attached to any type of microscope. Therefore, a cost increase of the focusing main body 10 does not occur.

Moreover, the wall surfaces 20c1, 20c2 perpendicular to the attaching surface 20a are utilized to attach the microscope holder 20 or 21 to the focusing main body 10. Therefore, no complicated processing is required, and the holder can be easily and securely positioned.

Figure 7:
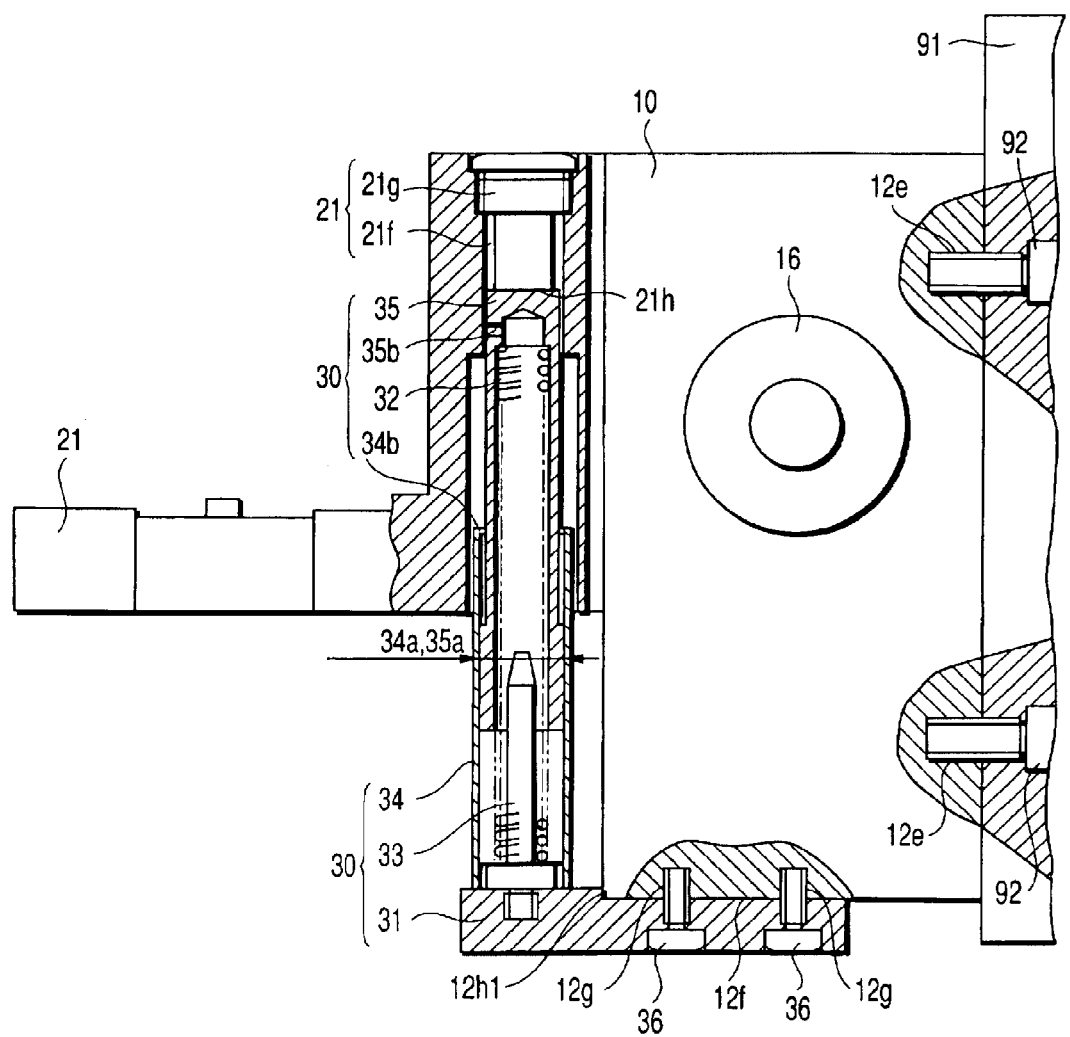
FIG. 7 is a schematic side sectional view showing the configuration of the microscope focusing apparatus according to another embodiment of the present invention.

FIG. 7 is a schematic side sectional view showing the configuration of the microscope focusing apparatus according to a second embodiment of the present invention. In FIG. 7, the same portions as those of FIGS. 1 to 6 are denoted with the same reference numerals.

In this microscope focusing apparatus, a plurality of screw holes 12e formed in the back surface of the focusing main body 10 are used to fix the main body to a support base 91 with bolts 92, and the microscope holder 21 is attached to the focusing movable portion 11 of the focusing main body 10.

A weight balance spring unit 30 comprises: a base 31 attached and fixed to the bottom surface of the focusing main body 10; a shaft 33 for guiding expansion and contraction of a compression coil spring 32; a cover 34 inserted along the shaft 33 so that the spring 32 is covered; and a movable frame 35 in which the spring 32 is inserted and which can vertically move with respect to the base 31 by the expansion and contraction of the spring. Moreover, the microscope holder 21 comprises a hole 21f into which the weight balance spring unit 30 is inserted, and a movable frame receiving portion 21g which is in contact with a tip end of the movable frame 35 to move together with the movable frame 35. The movable frame receiving portion 21g is screwed and fixed in a screw portion formed in an upper end of the hole 21f. A lower end surface of the movable frame receiving portion 21g forms an abutment portion 21h on which the movable frame 35 abuts by a balance force from the weight balance spring unit 30.

An outer diameter 35a of the movable frame 35 slidably engages with an inner diameter 34a of the cover 34. The movable frame 35 vertically moves along the inner diameter 34a of the cover 34 by the expansion and contraction of the spring 32 inserted in the movable frame 35.

Upward movement of the movable frame 35 is limited by a diaphragm 34b disposed on a tip end of the cover 34 and an end surface of the outer diameter 35a of the movable frame 35, and downward movement thereof is limited by a lower end surface of the movable frame 35 and a screw end surface of the shaft 33. Moreover, a movement amount of the movable frame 35 is allowed to meet a vertical movement amount of the microscope holder 21 attached to the focusing main body 10.

An air escape 35b is formed in the side surface of the movable frame 35 so that the movable frame 35 smoothly moves vertically.

Figure 8:
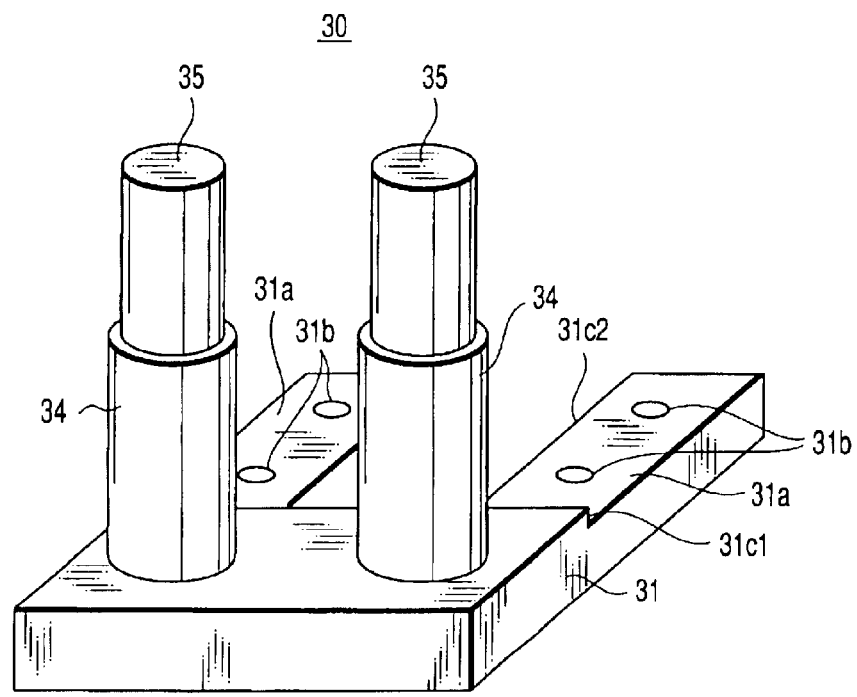
FIG. 8 is an appearance view of a weight balance spring unit according to the embodiment of the present invention.
Figure 9:
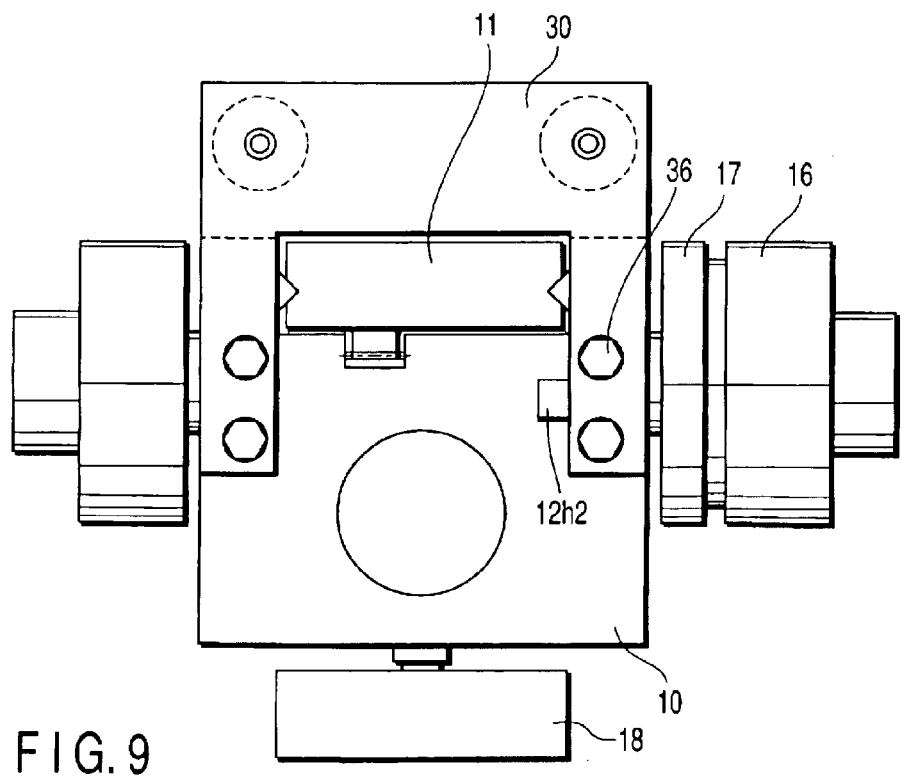
FIG. 9 is a diagram showing an attached state of the weight balance spring unit in a bottom of the focusing main body according to the embodiment of the present invention.

FIG. 8 is an appearance view of the weight balance spring unit 30, and FIG. 9 is a diagram showing an attached state of the weight balance spring unit 30 in the bottom of the focusing main body 10.

As shown in FIGS. 7, 8, 9, the base 31 of the weight balance spring unit 30 comprises an attaching surface 31a for attaching the unit to the focusing main body 10, a hole 31b for fixing the bolt, and positioning portions 31c1, 31c2 for positioning the unit. An attaching surface 12f, screw hole 12g, and positioning portions 12h1, 12h2 formed on the focusing main body 10 can be used to more easily attach/detach the unit by a plurality of bolts 36.

When the weight balance spring unit 30 is assembled between the microscope holder 21 and the focusing main body 10, an upward force acts on the microscope holder 21. As a result, the downward force applied to the focusing movable portion 11 (see FIG. 5) connected to the microscope holder 21 can be reduced, and weight balance can be kept.

Moreover, the weight balance spring unit 30 of FIG. 8 has two sliding movable frames 35, but one or three or more frames may be used in accordance with a required weight balance. Furthermore, when the movable frame receiving portion 21g and hole 21f are also disposed on the microscope holder 20 similarly as described above, the weight balance spring unit 30 can be assembled.

As described above, according to the microscope focusing apparatus of the second embodiment, the weight balance spring unit 30 can be attachably/detachably assembled with respect to the microscope holder 20 or 21 and the focusing main body 10. Therefore, it is possible to select the weight balance spring unit 30 having a different force amount in accordance with a load (weight of the microscope) applied to the microscope holder 20 or 21 and attach the unit. The unit can be adjusted in an allowable load range of the focusing main body 10 which is defined by the focusing mechanism described in the first embodiment. Therefore, the microscope system can be inexpensively constructed without exclusively using the focusing main body 10 of the microscope focusing apparatus in accordance with the applied load unlike the conventional art.

Figure 10:
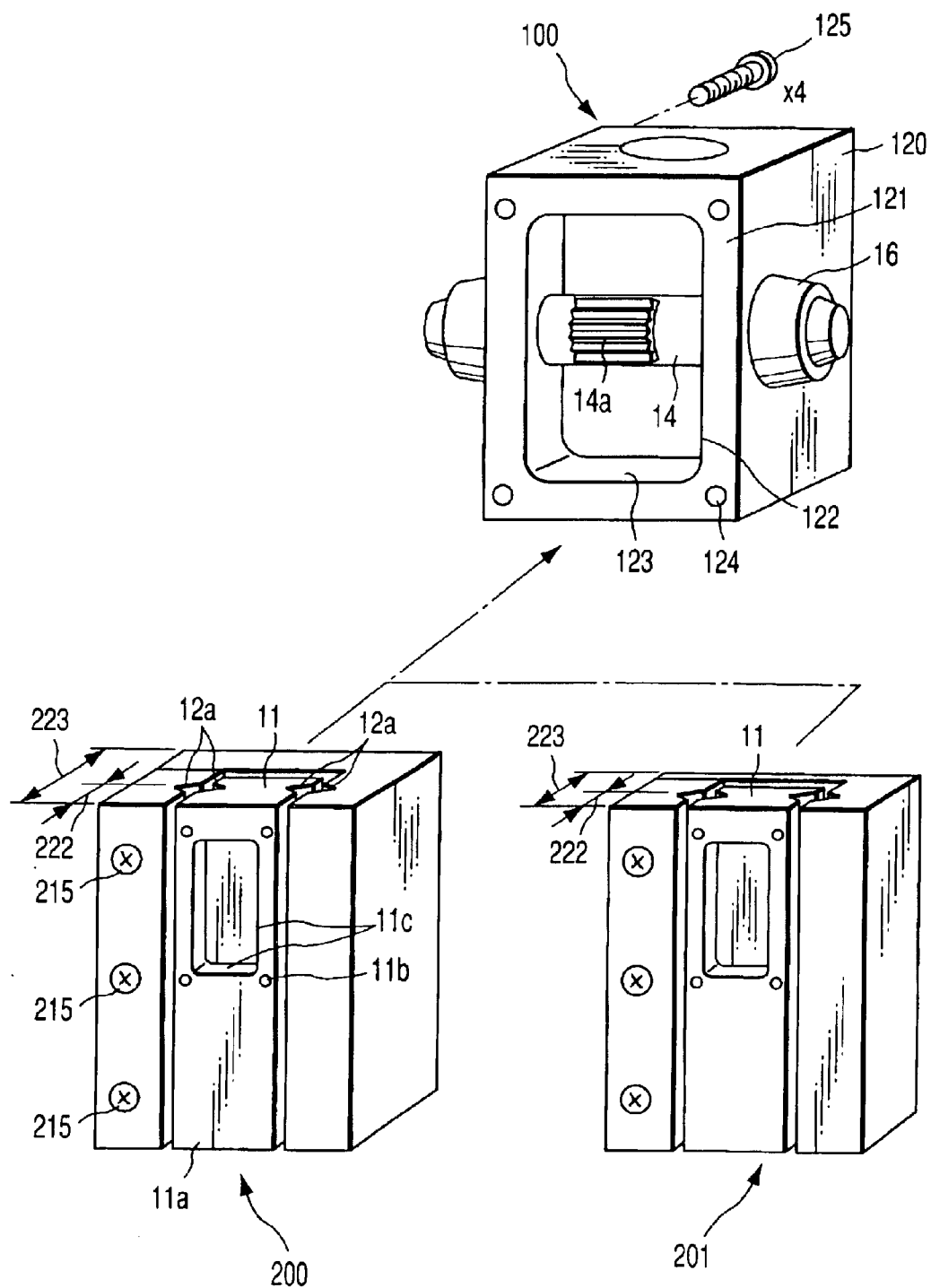
FIG. 10 is a diagram showing the schematic configuration of the microscope focusing apparatus according to another embodiment of the present invention.

FIG. 10 is a diagram showing the schematic configuration of the microscope focusing apparatus according to a third embodiment of the present invention. In FIG. 10, the same portions as those of FIGS. 1 to 9 are denoted with the same reference numerals.

The microscope focusing apparatus comprises: the microscope 1 shown in FIG. 1, and the like; and a focusing handle main body 100 and guide portion 200 (or 201) for vertically moving the microscope holder 20 (or 21) for supporting the microscope 1 and focusing on the sample 70. The focusing handle main body 100 and guide portion 200 (or 201) are integrally configured as described later, and therefore form the same configuration as the focusing main body 10. Additionally, the guide portions 200 and 201 have the same configuration except that the shape and size are different as described later.

The focusing handle main body 100 has a focusing handle frame 120, a handle rotary shaft 14, and a focusing handle 16. The focusing handle frame 120 has an attaching surface 121 for attaching the guide portion 200 (or 201), positioning portions 122, 123 having wall surfaces crossing at right angles to the attaching surface 121, and four counterbores 124.

Figure 11:
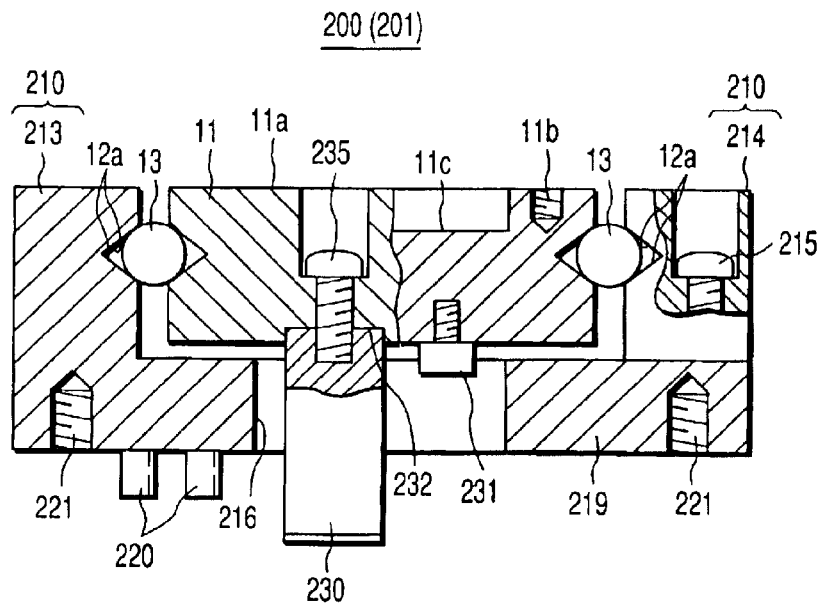
FIG. 11 is a schematic sectional view showing a structure of a guide portion as viewed from above according to the embodiment of the present invention.
Figure 12:
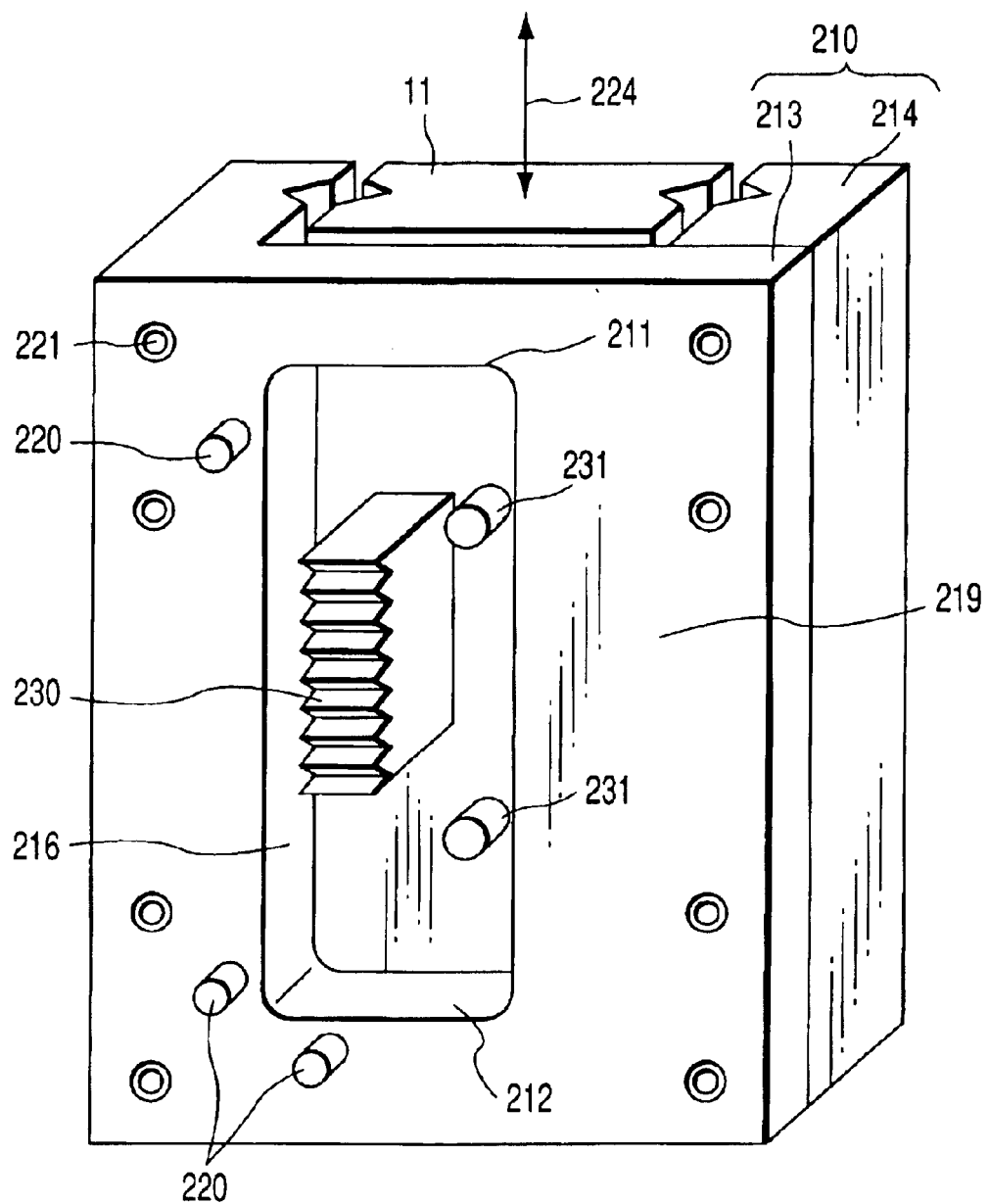
FIG. 12 is an appearance view of the guide portion as viewed from a back surface thereof according to the embodiment of the present invention.

FIG. 11 is a schematic sectional view showing a structure of the guide portion 200 (or 201) as viewed from above, and FIG. 12 is an appearance view of the guide portion 200 (or 201) as viewed from the back surface.

The guide portion 200 (or 201) has the focusing movable portion 11 for supporting the microscope holder 20 (or 21) while vertically moving, and a guide frame 210 for holding and guiding the focusing movable portion 11. Similarly, as the first embodiment, the front surface of the focusing movable portion 11 has the attaching surface 11a for attaching the microscope holder 20 (or 21), positioning portion 11c, and screw hole 11b. Moreover, a rack 230 and a stopper screw 231 are attached to the back surface of the focusing movable portion. The rack 230 abuts on a groove 232 formed in the focusing movable portion 11, and is positioned and fixed in the focusing movable portion 11 via a screw 235.

On the other hand, stopper screws 231, 231 are screwed into the focusing movable portion 11 while forming a vertical positional relation. Similarly as in the first embodiment, when the rotation of the pinion 14a of the focusing handle 16 is transmitted to the rack 230, the focusing movable portion 11 moves in the vertical direction. The stopper screws 231, 231 cooperate with the focusing movable portion 11, and abut on upper or lower wall surfaces 211 or 212 of the guide frame 210 to limit a movement stroke of the focusing movable portion 11. The movement stroke of the guide frame 210 can be changed by changing positions of the stopper screws 231, 231 and a length of the rack 230. That is, the movement stroke of the guide frame 210 can easily be changed only by changing the guide portion 200 without changing the focusing handle main body 100.

The guide frame 210 has a guide main body frame 213 and a single guide frame 214, and the guide groove 12a for sliding the focusing movable portion 11 by the cylindrical roller 13 or balls is formed in both frames. Moreover, the single guide frame 214 is fixed to the guide main body frame 213 by a bolt 215, preload adjustment is performed, and the guide frame 210 is assembled.

An elongated groove 216 for securing movement of the rack 230 is disposed in the guide main body frame 213, and the wall surfaces 211, 212 for limiting the movement stroke of the focusing movable portion 11 by the stopper screws 213, 213 are formed on upper and lower end surfaces of the elongated groove 216. Moreover, an attaching surface 219, three positioning pins 220, and a plurality of (eight) screw holes 221 are disposed on the back surface of the guide main body frame 213.

In FIG. 12, the wall surfaces 211, 212 for limiting the movement of the focusing movable portion 11 are shared with the elongated groove 216. However, another elongated groove may be formed separately from the elongated groove 16, and the wall surfaces 211, 212 may be formed in the elongated groove. In this case, the stopper screws 231, 231 vertically move in the another elongated groove, and are screwed into the focusing movable portion 11 to abut on the upper or lower wall surface 211 or 212 of the elongated groove. Moreover, when the another elongated groove is formed, one stopper screw 231 may be configured to abut on both the wall surfaces 211, 212.

A method of attaching the guide portion 200 (or 201) and focusing handle main body 100 will be described hereinafter. The attaching surface 219 on the back surface of the guide portion 200 (or 201) is abutted on the attaching surface 121 of the focusing handle main body 100, and is fixed via the counterbore 124 formed in the focusing handle frame 120 by the bolt 125. When a side portion of each positioning pin 220 of the guide portion 200 (or 201) is abutted on the wall surfaces of the positioning portions 122, 123 of the focusing handle frame 120, the guide portion and focusing handle main body can easily and securely be positioned.

Rigidity of the guide portion 200 (or 201) to be attached is changed in accordance with a thickness 222 of the guide groove 12a, shape and size 223 (thickness) of the guide frame 210, preload amount, guide system (roller, balls), material, and the like. Particularly, when the thickness 222 of the guide groove 12a, and the shape and size 223 (thickness) of the guide frame 210 are increased, the rigidity is effectively enhanced. Additionally, as shown in FIG. 10, the thickness 222 of the guide groove 12a, and the size 223 of the guide frame 210 are smaller in the guide portion 201 than in the guide portion 200.

Since the large guide portion 200 having a high rigidity, and the inexpensive and compact guide portion 201 having an insufficient rigidity can be selected and attached to the focusing handle main body 100, the microscope focusing apparatus can satisfy the demands of a broad range of usage.

As described above, according to the microscope focusing apparatus of the third embodiment, since the guide portion 200 or 201 is attachable/detachable with respect to the focusing handle main body 100, the guide portion 200 or 201 having a different rigidity can be selected and attached to the focusing handle main body 100.

For the microscope holder 20 described in the first embodiment, the mounted microscope is lightweight, and the gravity position has a relatively short distance with respect to a movement axis 224 of the focusing movable portion 11. Since a moment generated in the microscope holder 20 is small, the guide portion does not require a high rigidity. On the other hand, for the microscope holder 21 described in the first embodiment, the mounted microscope is heavy, and the gravity position has a large distance with respect to the movement axis 224 of the focusing movable portion 11. A large moment is generated in the microscope holder 21, and therefore the guide portion requires a high rigidity to such an extent that the moment can be permitted.

The respective gravity positions of the microscope holders differ with the microscope focusing apparatus in this manner. To solve the problem, the weight balance spring unit 30 is prepared for the microscope holder, and is attached to and disposed in the gravity position so that the moment is prevented from being generated. However, this is difficult in the system.

Therefore, the guide portions 200, 201 are set to be attachable/detachable with respect to the focusing handle main body 100, and the guide portions 200, 201 different in rigidity from each other can be selected. Even when the weight and gravity position largely differ with the mounted microscope, the problem can be inexpensively solved without preparing the focusing main body 10 for exclusive use.

Figure 14:
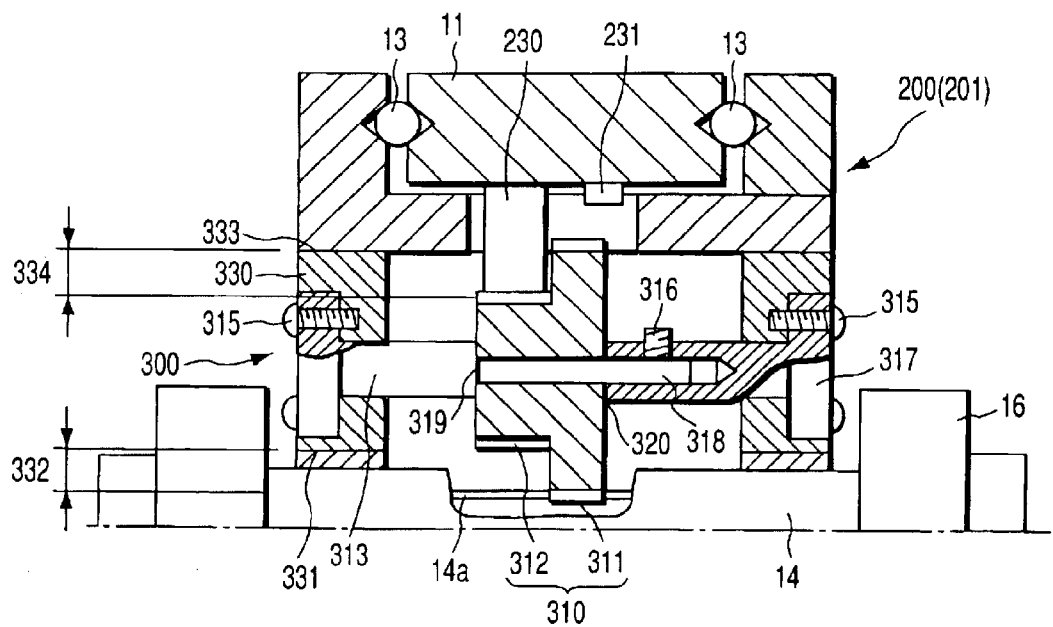
FIG. 14 is a schematic sectional view showing structures of the guide portion and a middle gear unit as viewed from above according to the embodiment of the present invention.
Figure 13:
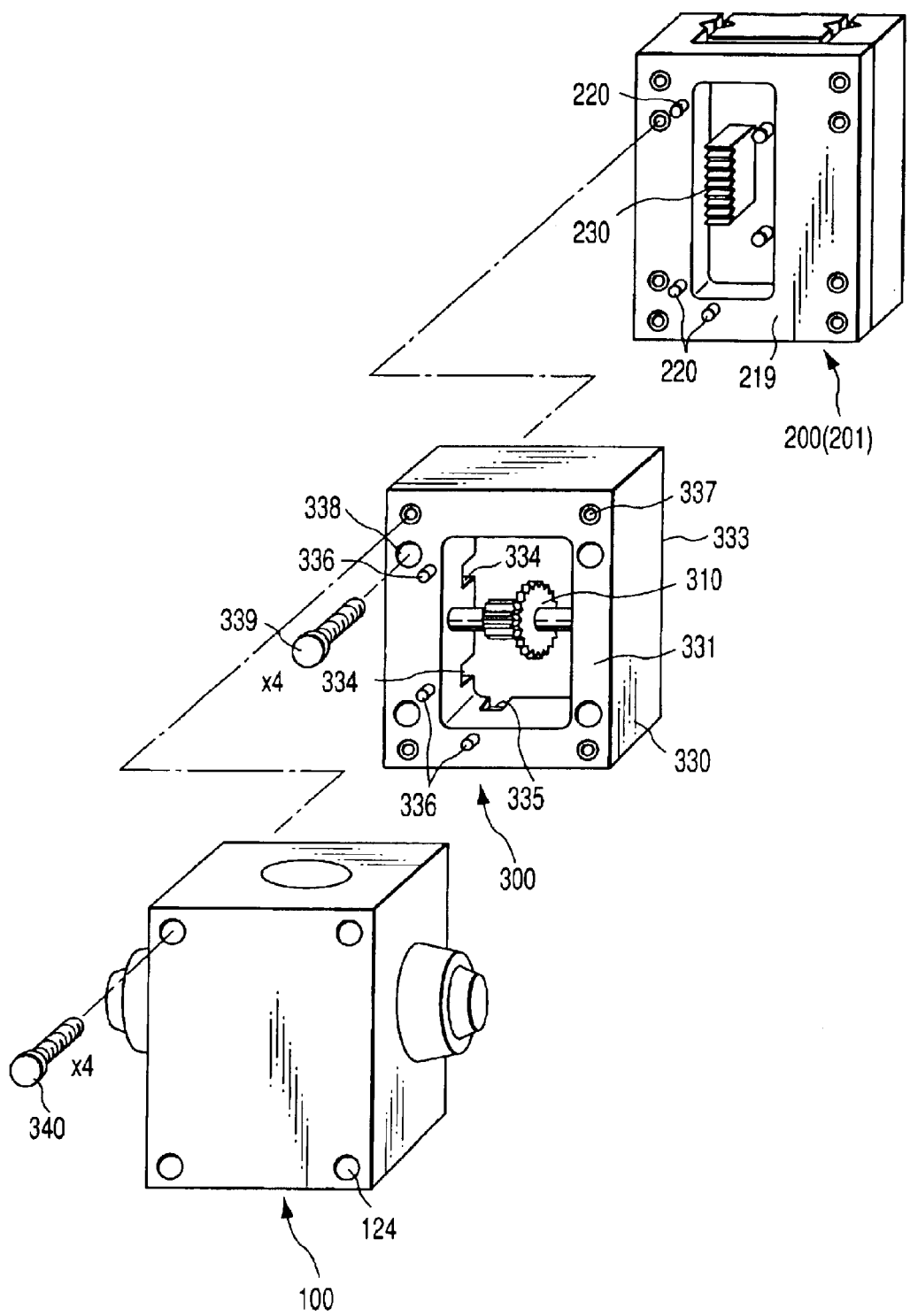
FIG. 13 is a diagram showing the schematic configuration of the microscope focusing apparatus according to another embodiment of the present invention.

FIG. 13 is a diagram showing the schematic configuration of the microscope focusing apparatus according to a fourth embodiment of the present invention, and FIG. 14 is a schematic sectional view showing structures of the guide portion 200 (or 201) and a middle gear unit 300 as viewed from above. In FIGS. 13, 14, the same portions as those of FIGS. 1 to 12 are denoted with the same reference numerals. Additionally, FIG. 13 is different from FIG. 10 in that the focusing handle main body 100 is viewed from a back surface side.

In this microscope focusing apparatus, the middle gear unit 300 is attached between the focusing handle main body 100 and the guide portion 200 (or 201) of the microscope focusing apparatus described in the third embodiment.

The middle gear unit 300 has a middle gear 310 including a large gear 311 and a small gear 312, a gear shaft 313, and a bearing 317. One end of the gear shaft 313 is fixed to a holding frame 330 by a screw 315, and the other end thereof is connected to the bearing 317 via a screw 316. The middle gear 310 is held so as to be rotatable with respect to a shaft 318 of the gear shaft 313, and the position of the gear is limited left and right by end surfaces 319, 320.

The bearing 317 connected to the gear shaft 313 is fixed to the holding frame 330 by the screw 315. The gear shaft 313 is disposed in such a manner that the rotation of the pinion 14a of the focusing handle 16 is transmitted to the rack 230 of the guide portion 200 (or 201) via the middle gear 310.

Moreover, a distance 332 between an attaching surface 331 and a toothed portion of the pinion 14a is set to be equal to a distance 334 between an attaching surface 333 and the toothed portion of the rack 230 in order to transmit the rotation of the pinion 14a to the rack 230 even when the middle gear unit 300 is not inserted.

A method of attaching the middle gear unit 300, focusing handle main body 100 and guide portion 200 (or 201) will be described hereinafter with reference to FIG. 13. The holding frame 330 of the middle gear unit 300 has the attaching surfaces 331, 333, positioning portions 334, 335, three positioning pins 336, four screw holes 337, and four counterbores 338.

When the middle gear unit 300 is attached to the guide portion 200 (or 201), the respective positioning pins 220 of the guide portion 200 (or 201) are allowed to abut on the positioning portions 334, 334, 335 in order to position the guide portion. The attaching surface 333 is brought into contact with the attaching surface 219 of the guide portion 200 (or 201), and the middle gear unit is fixed by a bolt 339 via the counterbore 338.

On the other hand, when the middle gear unit 300 is attached to the focusing handle main body 100, similar to the method of attaching the guide portion 200 (or 201), the side portions of the respective positioning pins 336 of the middle gear unit 300 are allowed to abut on the wall surfaces of the positioning portions 122, 123 and are positioned. Moreover, the attaching surface 331 is brought into contact with the attaching surface 121 of the focusing handle main body 100, and the middle gear unit is fixed by a bolt 340 via the counterbore 124 formed in the focusing handle main body 100.

As described above, according to the microscope focusing apparatus of the fourth embodiment, the middle gear unit 300 is set to be attachable/detachable between the focusing handle main body 100 and the guide portion 200 (or 201). When the middle gear unit 300 is changed, the movement amount of the focusing movable portion 11 per one rotation of the focusing handle 16 can easily be changed. Moreover, the middle gear unit 300 includes the holding frame 330 and middle gear 310, and is thus simply constituted. Therefore, the unit can be inexpensively manufactured.

FIG. 15A is a side view showing a configuration in which the microscope focusing apparatus according to the respective embodiments of the present invention is applied to various apparatuses, and FIG. 15B is a schematic plan sectional view. In FIGS. 15A, 15B, the same portions as those of FIG. 1 are denoted with the same reference numerals. A plurality of screw holes 12e are formed in a back surface 101 of the focusing main body 10, and a plurality of screw holes 401 are also formed in a support 400a of an apparatus 400. Moreover, in a stopper plate 500 for use in attaching the focusing main body 10 to the apparatus 400, a plurality of holes 501 and 502 are formed adapted to the screw holes 12e and 401.

When the focusing main body 10 is attached to the apparatus 400, first the stopper plate 500 is brought into contact with the back surface 101 of the focusing main body 10, and the respective screw holes 12e of the focusing main body 10 and the respective holes 501 of the stopper plate 500 are used to fix the stopper plate with respective bolts 503. Subsequently, the stopper plate 500 is brought into contact with the support 400a of the apparatus 400, and the respective screw holes 401 of the apparatus 400 and the respective holes 502 of the stopper plate 500 are used to fix the stopper plate with respective bolts 504.

When the screw holes and bolts are used via the stopper plate 500 in this manner, the focusing main body 10 can be directly attached to an opposite component such as the apparatus and used. Additionally, examples of the apparatus to which the focusing main body 10 is attached include a test apparatus and an observation apparatus such as a wafer and a liquid crystal substrate.

According to the microscope focusing apparatus of the present invention, the following actions/effects are produced.

According to the present invention, in the microscope focusing apparatus including the focusing main body for supporting the microscope including the light illuminator, and vertically moving the microscope to focus on the sample, the holder for supporting the microscope is formed as the unit. Since the holder can easily be attached to/detached from the focusing main body, the microscope having a different attaching shape can be assembled without exclusively using the focusing main body or without increasing the cost. Moreover, when the size and length of the holder are changed, even with the microscope focusing apparatus fixed to the stand or the assembly apparatus, the position of the optical axis of the microscope can also be changed in accordance with any demand.

Furthermore, with the microscope supporting holder attachably/detachably attached to the focusing main body, even when the method of attaching the microscope differs, the holder having an attachable shape is selected, and the microscope can thus be attached to the focusing main body.

According to the microscope focusing apparatus of the present invention, during attaching of the holder to the focusing movable portion, the wall surfaces perpendicular to the respective attaching surfaces can be utilized to easily position the holder. Moreover, the holder can be inexpensively attached without requiring any conventional slide dovetail processed portion.

According to the microscope focusing apparatus of the present invention, the elastic member for keeping the weight balance is attached to the holder as an additional unit. Even when the weight of the microscope largely differs, the load applied in the focusing movement direction can be adjusted to be an optimum load for the ability of the elastic member.

According to the microscope focusing apparatus of the present invention, the guide portion is set to be attachable/detachable with respect to the focusing handle main body. Even when the weight and gravity position of the microscope largely differ, the guide portion having a different rigidity can be selected in accordance with the magnitude of the moment applied to the guide portion. Moreover, since the guide portion is separate from the holder, the apparatus can be inexpensively manufactured.

According to the microscope focusing apparatus of the present invention, since the middle gear is attached as the additional unit between the guide portion and the focusing handle main body, the reduction ratio of the focusing handle can be selected. Since the guide portion and focusing handle main body are separate from and independent of each other, the middle gear can inexpensively be inserted with a simple structure.

According to the present invention, in the microscope focusing apparatus including the focusing main body for supporting the microscope including the light illuminator, and vertically moving the microscope to focus on the sample, the holder for supporting the microscope is formed as the unit. Since the holder can easily be attached to/detached from the focusing main body, the microscope having a different shape can be attached without exclusively using the focusing main body or without increasing the cost. Moreover, when the size and length of the holder are changed, even with the microscope focusing apparatus fixed to the stand or the assembly apparatus, the position of the optical axis of the microscope can also be changed in accordance with any demand.

Moreover, according to the microscope focusing apparatus of the present invention, during attaching of the holder to the focusing movable portion, the wall surfaces perpendicular to the respective attaching surfaces are utilized to position the holder. Therefore, the holder can be easily and securely attached to the portion inexpensively without requiring any complicated processing. Furthermore, for the holder, a round dovetail support shape which can support the microscope in a compact manner, and a wall surface support shape having general-purpose properties can be selected. Therefore, system properties are enhanced, and a broad range of user's requests can be satisfied.

Furthermore, according to the microscope focusing apparatus of the present invention, in order to keep the weight balance, the elastic member having a different force amount is selected, and attached as the additional unit to the holder and focusing main body. Therefore, the load applied to the focusing main body can be adjusted in an allowable range. Even when the mounted load changes because of the type of microscope or the attached unit, a suitable focusing main body does not have to be prepared, and the problem can be inexpensively solved.

Additionally, according to the microscope focusing apparatus of the present invention, the focusing handle main body and guide portion are set to be attachable/detachable. Therefore, since the guide portion having a different rigidity can easily be selected, it is unnecessary to prepare the exclusive-use focusing main body for the change of the weight and gravity position of the microscope, and the apparatus can be inexpensively applied to a broad range of systems. Moreover, since the guide portion is single and independent, the movement stroke can be inexpensively and easily changed without changing the focusing handle main body. Furthermore, since the guide portion is attachable/detachable with respect to the microscope holder, only the guide portion can be changed without changing the microscope holder. Therefore, the guide portion can be inexpensively changed.

Moreover, according to the microscope focusing apparatus of the present invention, the middle gear unit is selected as the additional unit and attached between the focusing handle main body and the guide portion. Therefore, the movement amount of the focusing movable portion per one rotation of the focusing handle can be inexpensively changed without preparing the exclusive-use focusing main body.

As described above, according to the present invention, there can be provided the microscope focusing apparatus which can be broadly and inexpensively attached with respect to the attaching shape of the microscope including the light illuminator for lighting the sample. Moreover, according to the present invention, there can be provided the microscope focusing apparatus which can be broadly and inexpensively changed with respect to the weight and gravity position of the microscope including the light illuminator for lighting the sample. Furthermore, according to the present invention, there can be provided the microscope focusing apparatus in which the reduction ratio of the focusing handle of the microscope including the light illuminator for lighting the sample can be easily and inexpensively selected. That is, according to the present invention, there can be provided the microscope focusing apparatus to which the microscope can be broadly and inexpensively attached.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A microscope apparatus comprising:

a revolver that holds an objective lens;

a first holder including an attaching portion which allows the revolver to be attached to a lower surface thereof, and a first support that supports on an upper surface thereof a first light illuminator to which an observation tube is attachable, the attaching portion and the first support being disposed on a first observation optical axis passing through the objective lens held by the revolver to be attached to the attaching portion;

a second holder including a second support that supports a second light illuminator which allows the revolver to be attached thereto, the second support being disposed outside a second observation axis passing through the objective lens held by the revolver;

a focusing main body including a focusing movable portion that is linearly and vertically movable;

a plurality of holder positioning portions formed on respective attaching surfaces of the first holder and the second holder to assemble one of (i) the first holder and (ii) the second holder with the focusing main body; and a focusing movable portion positioning portion formed on an attaching surface of the focusing movable portion to assemble the one of (i) the first holder and (ii) the second holder with the focusing main body;

wherein when the one the first holder and the second holder is assembled to the focusing main body, the one of the first holder and the second holder is positioned to the focusing main body by the focusing movable portion positioning portion of the focusing main body and the holder positioning portion of said one of the first holder and the second holder.

2. The microscope focusing apparatus according to claim 1, further comprising a weight balance portion comprising a fixed portion, a vertically movable portion, and an elastic member which biases the vertically movable portion in an upward direction, said fixed portion being attachably/detachably fixed to said focusing main body, wherein said first and second holders each further comprise an abutment portion which abuts on said vertically movable portion of said weight balance portion to receive an action of a bias force in said upward direction, and the bias force of said elastic member can be selected in accordance with the type of said microscope.

3. The microscope focusing apparatus according to claim 2, wherein said weight balance portion further comprises a stopper which defines a movement range of said vertically movable portion with respect to said fixed portion.

4. The microscope focusing apparatus according to claim 1, wherein said focusing main body is separated into a guide portion and a focusing handle main body, and said guide portion is selectively detachable from and attachable to said focusing handle main body.

5. The microscope focusing apparatus according to claim 4, wherein said guide portion comprises said focusing movable portion and a frame of said focusing movable portion, and wherein said focusing handle main body comprises a focusing handle and a frame of said focusing handle.

6. The microscope focusing apparatus according to claim 4, herein a middle gear portion is attachably/detachably disposed between said guide portion and said focusing handle main body.

7. The microscope focusing apparatus according to claim 1, wherein said first support of the first holder comprises a round dovetail, and supports said first light illuminator with the round dovetail.

8. The microscope focusing apparatus according to claim 1, wherein said second support of the second holder comprises at least one bolt, and supports said second light illuminator with the at least one bolt.

9. The microscope focusing apparatus according to claim 1, wherein the holder positioning portions comprise convexities having wall surfaces perpendicular to the attaching surfaces of the first and second holders, and the focusing movable portion positioning portion comprises a concavity having wall surfaces perpendicular to the attaching surface of the focusing movable portion.

10. The microscope focusing apparatus according to claim 1, wherein the holder positioning portions comprise concavities having wall surfaces perpendicular to the attaching surfaces of the first and second holders, and the focusing movable portion positioning portion comprises a convexity having wall surfaces perpendicular to the attaching surface of the focusing movable portion.

11. A microscope comprising the microscope focusing apparatus according to claim 10.

12. The microscope focusing apparatus according to claim 1, further comprising an elastic member provided between the focusing main body and the one the first holder and the second holder assembled to the focusing main body, said elastic member being selectively adjustable in elastic force in accordance with a load applied to said one of the first holder and the second holder.

13. The microscope focusing apparatus according to claim 12, wherein the elastic member comprises a spring.

* * * * *